3,290,414
BLOCK COPOLYMERS OF ALPHA $C_{1-4}$ ALKYL STYRENE AND ETHYLENE
William S. Anderson, Oakland, Calif., assignor to Shell Oil Company, New York, N.Y., a corporation of Delaware
No Drawing. Filed May 20, 1963, Ser. No. 281,825
4 Claims. (Cl. 260—878)

This invention relates to new and novel block copolymers of alpha-alkyl styrene and ethylene and to their use as multifunctional materials and in compositions of matter.

It is known that alpha-alkyl styrene can be polymerized in the presence of Friedel-Crafts catalysts, finely divided metallic sodium, peroxides and the like. Polymers of alpha-alkyl styrene and copolymers thereof polymerized by conventional means as mentioned results essentially in thermally unstable polymers which are generally brittle and difficult to work as in molding, extruding and the like.

It has now been discovered that an excellent oxidatively, mechanically and thermally stable transparent thermoplastic resin can be prepared by copolymerizing alpha-alkyl styrene with ethylene under particular controlled conditions to form a block polymer composed of (I) one or more blocks each containing 50–100 mol percent of ethylene units and (II) one or more blocks each containing 50–100 mol percent of α-alkyl styrene units. A particular feature of those blocks containing 50 mol percent of each monomer is that sequence of monomer units within such blocks is the alternating one, i.e.

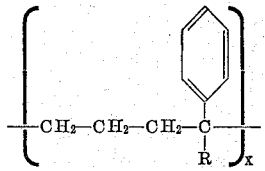

where $x$ is an integer of from 1 to 10,000, preferably between 10 and 1000. The molecular weight of these novel block polymers can range as determined by light scattering method from about 5,000 to about 1,000,000 or more, preferably between about 10,000 and 600,000 and having intrinsic viscosity in toluene of from about 0.2 to about 2, preferably from 0.5 to 1.5.

The new and novel block copolymers of the present invention are prepared by copolymerizing an alpha $C_1$–$C_4$ alkyl styrene and ethylene in the presence of a suitable solvent and an organo lithium catalyst at a temperature range from about minus 100° F. to 0° C. and at a pressure below 5,000 p.s.i. to form a block containing 50–100 mol percent of alpha-alkyl styrene then increasing the temperature to between 0° C. and 50° C. and the pressure to between 5,000 p.s.i. and 100,000 p.s.i. to form blocks containing 50–100 mol percent of ethylene. The pressures and temperatures may be applied in the order given above or may be applied in the reverse sequence; furthermore the temperatures and pressures may be repeatedly cycled between the ranges given so as to form polymers containing three, four, five or even 100 blocks. The desired changes in pressure can usually be obtained simply by changing the temperature; however, it is also possible to raise or lower pressure by adding or removing solvents or monomers to the reaction mixture.

By alpha-alkyl styrene is meant alpha-$C_1$-$C_4$-alkyl styrene such as alpha-methyl styrene, alpha-ethyl styrene, etc.

By suitable liquid solvents is meant certain oxygen-containing compounds such as dimethyl ether, diethyl ether, dioxane, diethyl ether of diethylene glycol, tetrahydrofuran, ethylene oxide, diphenylene oxide, or sulfur containing compounds such as diethyl sulfide, tetrahydrothiophene, etc. Preferred are the oxygen-containing solvents such as tetrahydrofuran, diethyl ether, or dioxane, or mixtures of these solvents or mixture of the hydrocarbons such as benzene, toluene, heptane, or the like. The oxygenated solvents aid in the reaction both as to reaction speed and yield of desired end product.

The catalyst may be an organo lithium such as an alkyl or aryl lithium compound, e.g., ethyl or normal or branched butyl, octyl lithium or phenyl or naphthyl lithium or mixtures thereof. The catalyst may also be a dilithio compound such as the lithium adduct of 1,1-diphenyl ethylene, or of stilbene or of alpha-methyl styrene or may also be an aliphatic dilithio compound such as 1,5-dilithio pentane, 1,6-dilithio hexane, etc. When a difunctional lithium compound is used, then the polymer grows at both ends and identical blocks become attached at both end of initiator. If A, B, C and D are used to represent blocks of a given length then the block polymer grown on a difunctional initiator will have the structure:

D C D A A B C D

End products of this invention may be used as thermoplastics, resins, optical goods, membranes, electrical insulating materials, lubricants per se or as an oil and wax additive and for many other uses.

When other types of catalysts such as the Friedel-Crafts catalyst or Ziegler type catalysts or other alkali metal catalysts, e.g., sodium or mixtures thereof with or without the presence of the above-mentioned solvents and under different pressure and temperature conditions from that of the present invention results in a different end product from the one made by the process of the present invention. Particular advantages of the alpha-methyl styrene block polymer of the present invention is their rigidity and high impact strength.

The following examples are illustrative of the present invention.

EXAMPLE IA

About 1:1 mol ratio of alpha-methyl styrene and ethylene was introduced into a stainless steel autoclave with a magnetically driven agitator containing a mixture of tetrahydrofuran toluene solvent and about 0.01% butyl lithium catalyst and the mixture reacted at 0° C. and 30,000 p.s.i. for about 1 hour to form a copolymer having alternating units of alpha-methyl styrene-ethylene which has a molecular weight of 50,000. At this point the reaction temperature was dropped to between −50 and −80° C. and the reaction continued for 24 hours. Block units of alpha-methyl styrene formed and the final block copolymer was polymer having a molecular weight of 80,000–100,000.

Following the procedure of Example IA the following other block copolymers were prepared as shown in Table I.

Table I

| Example | First Stage Pressure, p.s.i. | First Stage Temperature, °C. | Second Stage Pressure | Second Stage Temperature, °C. | Percent Ethylene | Polymer Composition | |
|---|---|---|---|---|---|---|---|
| | | | | | | Percent α-methyl styrene | Intrinsic Visc. in Toluene, 25° C. End Product |
| IB Ethylene/α-methyl styrene | 30,000 | +20 | Atm | −40 | 60 | 40 | 0.2 |
| IC Ethylene/α-methyl styrene | 40,000 | +30 | 3,500 p.s.i. | −40 | 50 | 50 | 0.5 |
| ID Ethylene/α-methyl styrene | 50,000 | +50 | Atm | −50 | 40 | 60 | 0.8 |
| IE Ethylene/α-methyl styrene | 30,000 | +10 | Atm | −70 | 50 | 50 | 0.1 |
| IG Ethylene/α-methyl styrene | 30,000 | 0 | Atm | −35 | 50 | 50 | 0.15 |

IB solvent=tetrahydrofuran, catalyst=butyllithium.
IB solvent=mixture (50/50) tetrahydrofuran and toluene, catalyst=butyl lithium.
ID solvent=mixture (50/50) tetrahydrofuran and heptane, catalyst=lithium biphenyl.
IE solvent=tetrahydrofuran, catalyst=naphthyl lithium.
IG solvent=tetrahydrofuran, catalyst=lithium naphthalene.

EXAMPLE IIA

In a stainless steel autoclave a 10:1 mol ratio of ethylene and alpha-methyl styrene were charged and reacted in tetrahydrofuran solvent and butyl lithium catalyst at −50 to −80° C. and 3,000 p.s.i.g. pressure for 1 hour to form a 10,000 molecular weight alpha-methyl styrene polymer. The reaction temperature was then increased to 30–35° C. and the pressure adjusted to 30,000 p.s.i.g. and the reaction was continued under agitation for about 24 hours. The polymer consisted of a block of alpha-methyl styrene units attached to a block of alternating ethylene and alpha-methyl styrene units. Its molecular weight was 50,000.

Following the procedure of IIA the following block copolymers were prepared as shown in Table II.

Alternating copolymers of the present invention are optically transparent whereas random polymerized ethylene/alpha-methyl styrene copolymers are not.

A shortcoming of thermoplastics made from poly-alpha-methyl styrene homopolymer is their thermal instability. At the temperatures required for molding or extruding, or in fact at any temperature greater than about 200° C., poly-alpha-methyl styrene decomposes to the monomer. By copolymerizing alpha-methyl styrene with ethylene as described this decomposition is retarded making it possible to mold or extrude objects at higher temperatures and therefore at higher rates than are possible when using poly-alpha-methyl styrene.

A drawback of alpha-methyl styrene polymers prepared for use as plastics (for example, those prepared according Table II

| Example | First Stage Pressure, p.s.i., °C. | First Stage Temperture | Second Stage Temperature, °C. | Second Stage Pressure, p.s.i. | Percent Ethylene | Polymer Composition | |
|---|---|---|---|---|---|---|---|
| | | | | | | Percent α-methyl Styrene | Intrinsic Visc. in Toluene, 25° C., End Product |
| IIB Ethylene/α-methyl styrne | −35 | Atm | 50 | 30,000 | 50 | 50 | 0.12 |
| IIC Ethylene/α-methyl styrene | −50 | 400 p.s.i | 10 | 40,000 | 40 | 60 | 0.5 |
| IID Ethylene/α-methyl styrene | −70 | 400 p.s.i | 0 | 50,000 | 30 | 70 | 0.8 |

IIB solvent=tetrahydrofuran, catalyst=lithium diphenylethylene.
IIC solvent=tetrahydrofuran, catalyst=octyl lithium.
IID solvent=mixture tetrahydrofuran and benzene, catalyst=butyl lithium.

Block copolymers of the present invention possess new and novel properties. Thus, block copolymers IA and IIA are oxidation resistant. At 150° C., oxidation of these copolymers by air after 40 hours was undetectable whereas ethylene propylene copolymer and isoprene/alpha-methyl styrene copolymers were badly degraded by this treatment. Also, block copolymer IA and IIA when heated as a thin film for 135 hours at 200° C. turned yellow. Polyethylene (M.W. 6000) and polyisobutylene (10–12,000) films heated under these conditions completely discolored at 1–2 and 5–10 hours, respectively.

Block copolymers IA and IIA when subjected to irradiation with 3 mev. electrons at 25° C. required for gelation a dose 100 times larger than that required for polyethylene.

to U.S. 2,621,171, 2,658,058 and 2,507,338) is their brittleness. Block copolymerization of ethylene with alpha-methyl styrene prepared by the methods described in the present application removes this deficiency. For example, a poly-alpha-methyl styrene piece ¼" x ¼" x 1½" breaks easily when dropped on a hard surface from a height of two feet. Copolymers IA or IIA of the present invention are tough, flexible solids which do not break even when thrown against a hard surface. Thermogravimetric data demonstrating the superior thermal stability of ethylene-alpha-methyl styrene block copolymers over other types of polymers are shown in Table III below.

Table III*

| | 5% wt. loss, °C. | 10% wt. loss, °C. | 15% wt. loss, °C. |
|---|---|---|---|
| Poly-alpha-methyl styrene | 215 | 325 | 340 |
| Poly-methyl methacrylate | 250 | 272 | 285 |
| Poly-isobutylene | 285 | 300 | 308 |
| Copolymer isoprene/alpha-methyl styrene | 321 | 332 | 341 |
| Example IA copolymer | 370 | 393 | 398 |
| Example IIA copolymer | 393 | 410 | 415 |
| Example IB copolymer | 371 | 385 | 395 |

*Polymers heated under 50 ml./min. of nitrogen, at 25° C./minute. Figures in wt. loss column are T, °C. required to reach the indicated wt. losses.

The VI properties of oils can be improved by incorporating therein from 0.1 to 5% of block copolymers of the present invention. Thus, addition of 1% of block copolymers IA or IIA to a mineral oil (VI=70) increases the viscosity index to around 120.

Block copolymers of the present invention are compatible with waxes, rubber (natural and synthetic), moldable resins, ion exchange resins and can be used in radiation resistant oils, greases, plastics, dielectrics, optical goods, synthetic leather, drilling muds, lubricants and the like.

I claim as my invention:

1. A process for producing high molecular weight block copolymers of alpha-$C_{1-4}$-alkyl styrene and ethylene composed of one or more blocks each containing 50–100 mol percent of ethylene units and one or more blocks each containing 50–100 mol percent of alpha-$C_{1-4}$-alkyl styrene, such block polymers being prepared by copolymerizing ethylene and alpha-alkyl styrene in a mole ratio between 1:10 and 10:1 in a polar-containing organic solvent selected from the group consisting of an oxygen containing and a sulfur-containing organic solvent and with an organo lithium catalyst at a temperature between 0° C. and 50° C. and a pressure between 5,000 and 100,000 p.s.i. for a substantial period of time, and continuing the copolymerization under the same conditions for an additional period of time between —100° C. and 0° C. and at a pressure below 5,000 p.s.i., the resulting block polymer having a molecular weight of from 6,000 to 500,000.

2. A process for producing high molecular weight copolymers of alpha-$C_{1-4}$-alkyl styrene and ethylene having in the center of the macromolecule a block containing 50–100 mol percent of alpha-$C_{1-4}$-alkyl styrene units and at the end of the macromolecule a block containing 50–100 mol percent of ethylene, such block polymers being prepared by copolymerizing ethylene and alpha-$C_{1-4}$-alkyl styrene in a mol ratio between 1:10 and 10:1 in an oxygen-containing solvent and with an organo lithium catalyst at a temperature between —100 and 0° C. and at a pressure below 5,000 p.s.i. then increasing the temperature between 0 and 50° C. and a pressure between 5,000 and 100,000 p.s.i. for a substantial period of time, the resulting block polymer having a molecular weight of from 6,000 to 500,000.

3. A process for producing high molecular weight block copolymers of alpha-$C_{1-4}$-alkyl styrene and ethylene having in the center of the macromolecule a block consisting of alternating units of ethylene and alpha-$C_{1-4}$-alkyl styrene and at the ends of the macromolecule blocks consisting of alpha methyl styrene units, such block polymers being prepared by copolymerizing ethylene and alpha alkyl styrene in a mol ratio between 1:10 and between 1:10 and 10:1 in an oxygen-containing organic solvent and with a difunctional organo lithium catalyst at a temperature between 0 and 50° C. and a pressure between 5,000 and 100,000 p.s.i. and then decreasing the temperature between —100° C. and 0° C. and decreasing the pressure below 5,000 p.s.i. for a substantial period of time the resulting block polymer having a molecular weight of from 6,000 to 500,000.

4. A process for producing high molecular weight block copolymers of alpha-$C_{1-4}$-alkyl styrene and ethylene having in the center of the macromolecule a block consisting of alpha alkyl styrene units and at the ends blocks consisting of alternate units of ethylene and alpha alkyl styrene such block polymers being prepared by copolymerizing ethylene and alpha alkyl styrene in a mol ratio between 1:10 and 10:1 in an oxygen-containing solvent and with a difunctional organo lithium catalyst at a temperature between —100° C. and 0° C. and the pressure below 5,000 p.s.i. then increasing the temperature between 0 and 50° C. and the pressure between 5,000 p.s.i. and 100,000 p.s.i. for a substantial period of time the resulting block copolymer having a molecular weight of from 6,000 to 500,000.

References Cited by the Examiner

UNITED STATES PATENTS 3,189,665   6/1965   Nozaki _____ 260—878

MURRAY TILLMAN, *Primary Examiner.*

D. J. BREZNER, *Assistant Examiner.*